(12) United States Patent
Cocchi et al.

(10) Patent No.: US 11,241,023 B2
(45) Date of Patent: Feb. 8, 2022

(54) MACHINE FOR MAKING LIQUID OR SEMI-LIQUID FOOD PRODUCTS AND METHOD OF OPERATING THE MACHINE

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 307 days.

(21) Appl. No.: 16/399,114

(22) Filed: Apr. 30, 2019

(65) Prior Publication Data

US 2019/0335786 A1 Nov. 7, 2019

(30) Foreign Application Priority Data

May 2, 2018 (IT) .......................... 102018000005008
Aug. 27, 2018 (IT) .......................... 102018000008193

(51) Int. Cl.
*A23G 9/16* (2006.01)
*A23G 9/22* (2006.01)

(52) U.S. Cl.
CPC .............. *A23G 9/166* (2013.01); *A23G 9/228* (2013.01)

(58) Field of Classification Search
CPC . A23G 9/28; A23G 9/228; A23G 9/08; A23G 9/281; A23G 9/22; A23G 9/166;
(Continued)

(56) References Cited

U.S. PATENT DOCUMENTS 2,909,433 A * 10/1959 Morrison .................. A23G 9/16
426/393
2,924,952 A * 2/1960 Swenson .................. A23G 9/20
62/304

(Continued)

FOREIGN PATENT DOCUMENTS

EP 0448503 A1 9/1991
EP 0448503 B1 * 12/1993 ............. A23G 9/228
(Continued)

OTHER PUBLICATIONS

Italian Search Report dated Apr. 9, 2019 from counterpart Italian App No. IT201800008193.
(Continued)

*Primary Examiner* — Frantz F Jules
*Assistant Examiner* — Martha Tadesse
(74) *Attorney, Agent, or Firm* — Shuttleworth & Ingersoll, PLC; Timothy Klima

(57) ABSTRACT

A machine for making liquid or semi-liquid food products comprises:
a frame;
a first container containing a liquid or semi-liquid base product;
a second container defining a processing chamber for processing a base mixture made up of the liquid or semi-liquid base product and a gas;
a stirrer mounted inside the second container;
thermal treatment means associated with the second container, acting in conjunction with the stirrer to convert the base mixture inside the second container into a finished liquid or semi-liquid product;
a connecting duct connecting the first container to the second container and configured to connect the first container to the second container in such a way as to allow the base mixture to be transferred to the second container;

(Continued)

a dispenser connected to the second container to allow dispensing the finished product.

20 Claims, 12 Drawing Sheets

(58) Field of Classification Search
CPC . A23G 9/04; A23G 9/20; A23G 9/222; A23G 9/12; A23G 9/045; A23G 9/18; B65B 31/044; B65B 3/045
See application file for complete search history.

(56) References Cited

U.S. PATENT DOCUMENTS

| | | | | |
|---|---|---|---|---|
| 2,951,504 | A * | 9/1960 | McBroom | A23G 9/20 137/606 |
| 3,183,681 | A * | 5/1965 | Lutz | A23G 9/12 62/135 |
| 3,196,627 | A * | 7/1965 | Swenson | A23G 9/20 62/136 |
| 3,222,035 | A * | 12/1965 | Lutz | A23G 9/20 366/104 |
| 3,256,100 | A * | 6/1966 | Bernstein | A23G 9/20 62/70 |
| 3,359,748 | A * | 12/1967 | Booth | A23G 9/228 62/136 |
| 3,477,244 | A * | 11/1969 | Scoggins | A23G 9/045 62/306 |
| 3,517,524 | A * | 6/1970 | Fiedler | A23G 9/045 62/188 |
| 3,641,783 | A * | 2/1972 | Werner | A23G 9/224 62/343 |
| 3,715,893 | A * | 2/1973 | Werner | A23G 9/281 62/135 |
| 4,052,180 | A * | 10/1977 | Erickson | A23G 9/20 62/188 |
| 4,221,117 | A * | 9/1980 | Martineau | A23G 9/20 62/306 |
| 4,412,428 | A * | 11/1983 | Giannella | A23G 9/281 366/155.1 |
| 4,476,146 | A * | 10/1984 | Manfroni | A23G 9/08 426/522 |
| 4,680,944 | A * | 7/1987 | Menzel | A23G 9/228 62/342 |
| 4,758,097 | A * | 7/1988 | Iles, Sr. | A23G 9/163 366/102 |
| 4,817,396 | A * | 4/1989 | Menzel | A23G 9/305 62/306 |
| 4,831,839 | A * | 5/1989 | Anderson | A23G 9/20 137/512 |
| 4,850,205 | A * | 7/1989 | Mills | A23G 9/20 62/308 |
| 5,072,599 | A * | 12/1991 | Simone | A23G 9/20 62/308 |
| 5,277,037 | A * | 1/1994 | Gram | A23G 9/228 62/306 |
| 6,490,872 | B1 * | 12/2002 | Beck | A23G 9/045 62/303 |
| 9,326,531 | B1 * | 5/2016 | Reich | A23G 9/228 |
| 2012/0223094 | A1 * | 9/2012 | Rickard, Jr | A23G 9/045 222/1 |
| 2014/0335250 | A1 * | 11/2014 | Cocchi | A23G 9/26 426/512 |
| 2014/0356494 | A1 * | 12/2014 | Cocchi | B65B 3/045 426/231 |
| 2015/0201645 | A1 * | 7/2015 | Cocchi | A23G 9/22 426/231 |
| 2016/0205966 | A1 * | 7/2016 | Cocchi | A23G 9/12 |
| 2016/0353767 | A1 * | 12/2016 | Cocchi | A23G 9/166 |
| 2017/0318830 | A1 * | 11/2017 | Resnick | A23G 9/28 |
| 2018/0103656 | A1 | 4/2018 | Acosta et al. | |

FOREIGN PATENT DOCUMENTS

EP 2807930 A1 * 12/2014 ............. A23G 9/04
EP 3172970 A1 5/2017

OTHER PUBLICATIONS

Italian Search Report dated Dec. 10, 2018 from counterpart Italian App No. 201800005008.

* cited by examiner

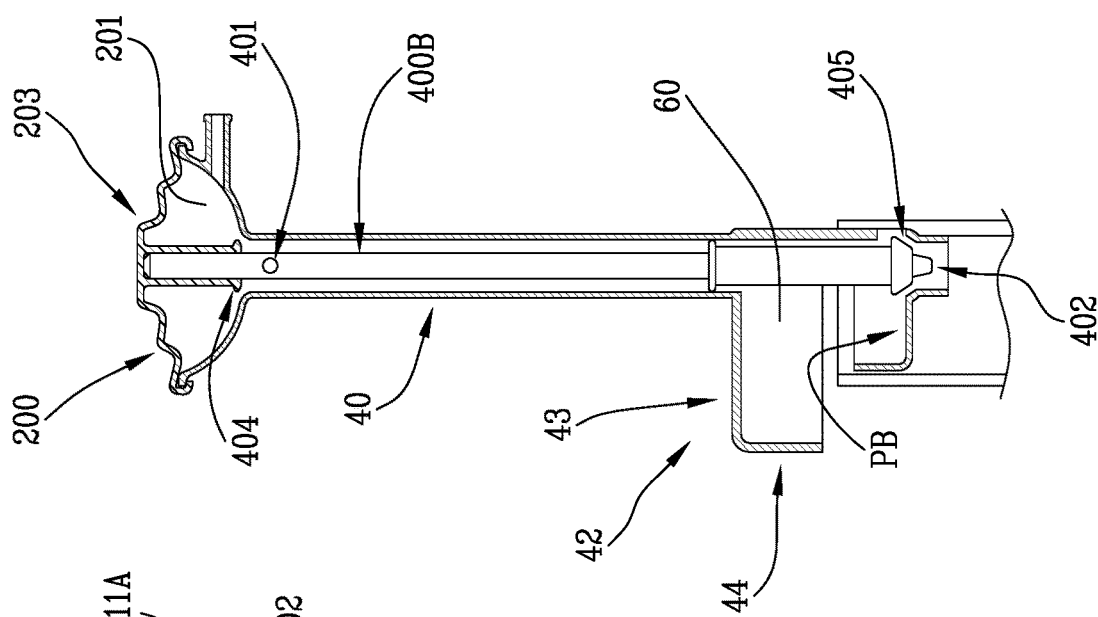
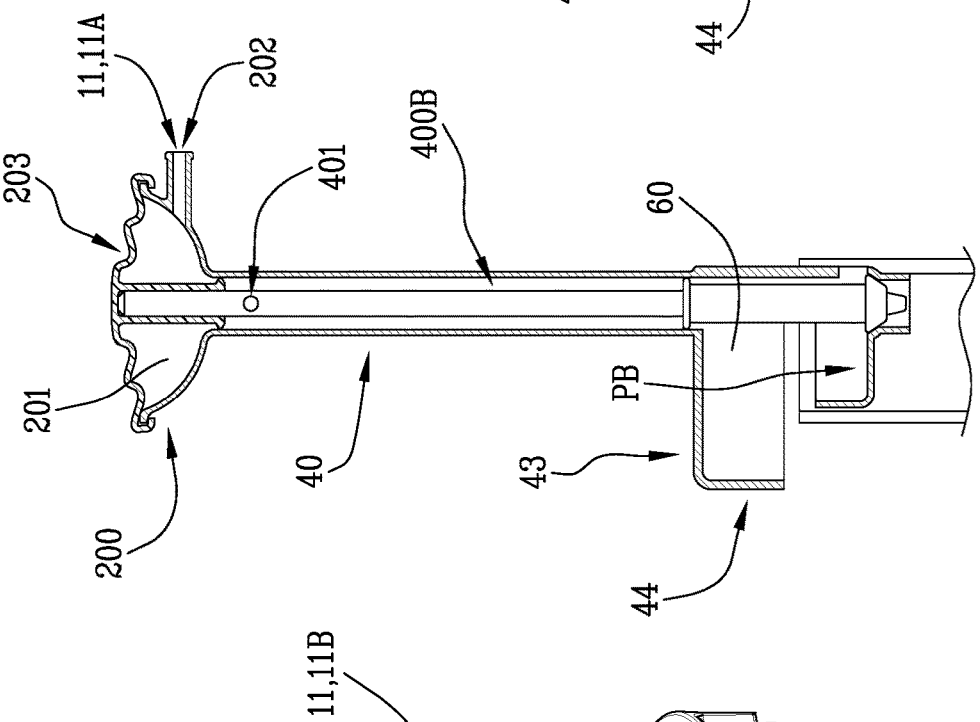
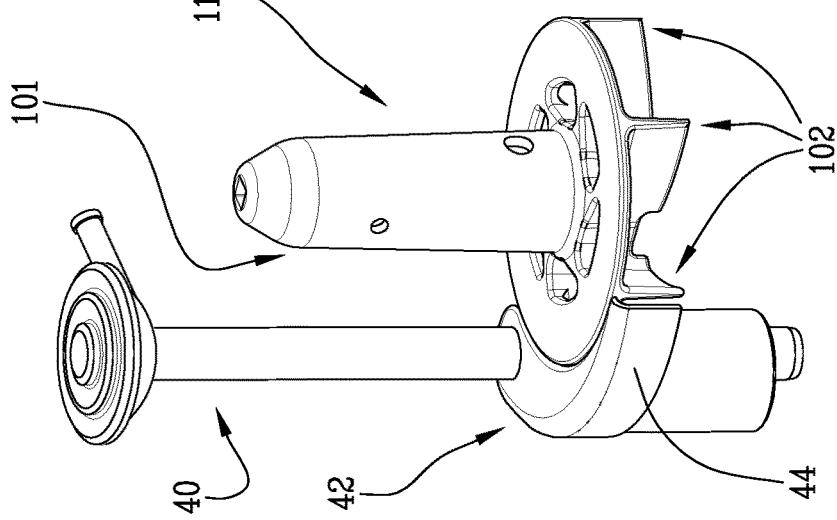

MACHINE FOR MAKING LIQUID OR SEMI-LIQUID FOOD PRODUCTS AND METHOD OF OPERATING THE MACHINE

This application claims priority to Italian Patent Application No. 102018000005008 filed May 2, 2018 and Italian Patent Application No. 102018000008193 filed Aug. 27, 2018. The entirety of both applications are incorporated by reference herein.

BACKGROUND OF THE INVENTION

This invention relates to a machine for making liquid or semi-liquid food products, in particular ice cream or soft ice cream type products and to a method for operating the machine.

In the ice cream trade in question, ice cream machines are known which comprise a batch freezing cylinder associated with a refrigeration system and equipped with a stirrer.

The batch freezing cylinder allows making the finished product (ice cream or soft ice cream) from a basic mixture.

With reference in particular to machines for making soft ice cream, a first type of machine comprises a feed tank connected to the batch freezing cylinder by a connecting duct.

The feed tank allows supplying the batch freezing cylinder with a liquid or semi-liquid base product mixed with air.

In effect, the tank normally includes a device for mixing the base product with air so as to feed a base mixture (containing base product and air) to the batch freezing cylinder.

When the amount of finished product in the batch freezing cylinder decreases as a result of being dispensed, the batch freezing cylinder must obviously be supplied with more base mixture through the connecting duct; under these transient conditions, it is particularly difficult, in prior art machines, to feed the mixture of air and base liquid in the correct stoichiometric ratio.

That is because dispensing the finished product creates a negative pressure inside the batch freezing cylinder and, as a result, the base product dispensed from the tank is not mixed with air in the optimum ratio, which means the base mixture fed in does not have the right properties for optimum quality.

This problem inevitably leads to the production of a finished product of lower quality.

Generally speaking, therefore, a particularly strongly felt need, under all operating conditions of the machine, is that of being able to control more precisely the conditions of feeding the batch freezing cylinder, in particular after the product is dispensed from the batch freezing cylinder, so as to ensure that the base mixture is fed under the best quality conditions.

Thus, a particularly strongly felt need in the trade concerned is the need for a machine for making liquid or semi-liquid products which can constitute a valid alternative to existing types of machines and which can guarantee that the mixture is fed to the batch freezing cylinder in the optimum manner under any operating conditions.

Another need in the trade concerned is the need to be able to very precisely regulate and, in particular, to bring up to high values, the overrun parameter measured in a sample volume, as follows:

overrun=((liquid base product weight−finished product weight)/(finished product weight))*100.

More specifically, a particularly strongly felt need is that of being able to make a product having a particularly high overrun.

SUMMARY OF THE INVENTION

This invention therefore has for an aim to meet the above mentioned needs, that is to say, more specifically, to be able to provide a machine (and a method for operating the machine) for making and dispensing liquid or semi-liquid food products, specifically products of the ice cream or soft ice cream type, which can ensure that the batch freezing cylinder is fed in optimum manner under any operating conditions.

A further aim of this invention is to provide a machine (and a method for operating the machine) for making and dispensing liquid or semi-liquid food products and which can ensure that the product made has a particularly high overrun.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

FIG. 12 is a perspective view of a detail of the embodiment of FIG. 8 according to a variant different from that of FIGS. 9-11;

FIGS. 13-14 are partial cross sections of a detail from FIG. 12.

DESCRIPTION OF THE PREFERRED EMBODIMENTS

Figure 1:
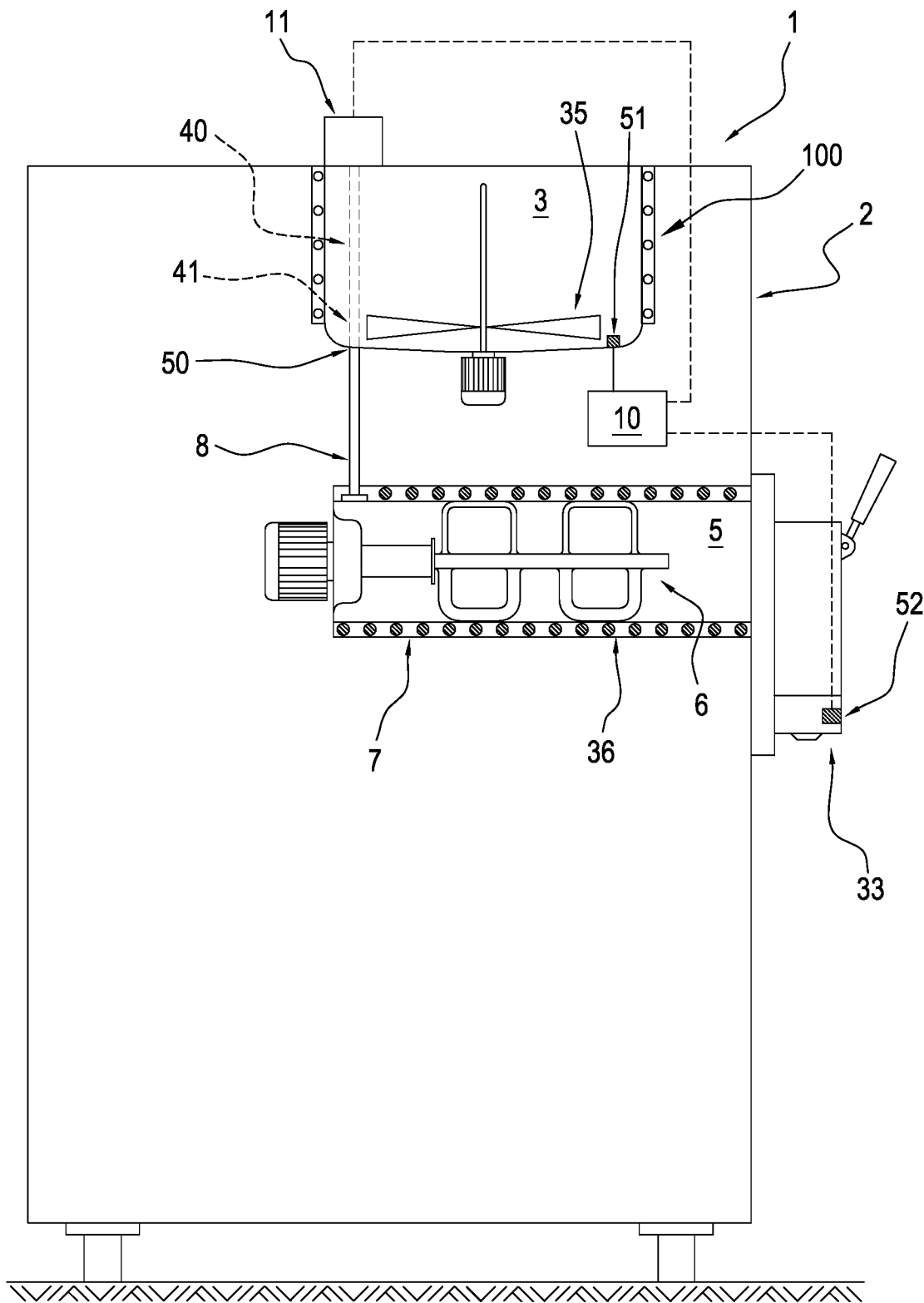
FIG. 1 is a schematic side view of a first embodiment of the machine of this invention for making liquid or semiliquid products.

With reference to the accompanying drawings, the numeral 1 denotes an apparatus or machine for making food products (preferably liquid or semi-liquid).

Preferably, the machine 1 is a machine for making ice cream.

Still more preferably, the machine 1 is a machine for making soft ice cream (or similar products such as sorbets, etc.).

According to the invention, the machine 1 for making food products (preferably liquid or semi-liquid) comprises a frame 2.

According to another aspect, the machine 1 comprises at least one first container 3 adapted to contain a liquid or semi-liquid base product;

In the embodiments illustrated in the accompanying drawings, the first container 3 is a tank (open at the top and closable with a lid).

Preferably, the first container 3 has a stirrer 35 inside it.

Preferably, the first container 3 has a hole 50 on the bottom of it to allow the product it contains to flow out.

According to another aspect, the machine 1 comprises a second container 5, defining a processing chamber for processing a base mixture (made up of the liquid or semi-liquid base product and a gas, the latter preferably being air).

The machine 1 is also provided with a stirrer 6 and with thermal treatment means 7 for the basic mixture, operating in conjunction with one another to convert the basic mixture into a liquid or semi-liquid product.

The second container 5 is preferably cylindrical in shape.

Preferably, the stirrer 6 is configured to scrape the inside wall of the second container 5.

Preferably, the thermal treatment means 7 comprise a thermodynamic system adapted to run a thermodynamic cycle.

The thermodynamic system preferably comprises a closed circuit containing a heat exchanger fluid.

The thermodynamic system preferably comprises a compressor (not illustrated) disposed along the circuit.

The thermodynamic system preferably comprises a first exchanger (not illustrated), disposed along the circuit.

The thermodynamic system preferably comprises a second exchanger 36 disposed along the circuit.

Preferably, the second exchanger 36 is associated with the second container 5.

The thermodynamic system preferably comprises a pressure reducing element (e.g. a throttle valve, not illustrated) disposed along the circuit.

The thermodynamic system preferably comprises a further, third exchanger 100 associated with the first container 3.

The above mentioned components (compressor, pressure reducing element, first exchanger, second exchanger 36 and third exchanger 100, if any) of the thermodynamic system form an active part of the closed circuit.

It should be noted that the compressor is disposed in one leg of the circuit, interposed between an inlet of the first exchanger and an outlet of the second exchanger 36, whilst the pressure reducing element is disposed in another leg of the circuit, between an outlet of the first exchanger and an inlet of the second exchanger 36.

The thermodynamic cycle is preferably a vapor compression cycle.

According to another aspect, the machine 1 comprises a connecting duct 8 connecting the first container 3 to the second container 5 and configured to connect the first container 3 to the second container 5 in such a way as to allow the base mixture (that is, the base product mixed with gas) to be transferred from the first container 3 to the second container 5.

According to another aspect, the machine 1 comprises a dispenser 33 connected to the first container 5 to allow the product to be extracted.

The dispenser 33 can be turned on or off to allow or inhibit dispensing of the product from the container 5, respectively.

It should be noted that, at the first container 3, the duct 8 is preferably connected to a tubular supply element 40.

More precisely, the tubular supply element 40 is, in use, disposed inside the first container 3.

According to another aspect, the machine 1 comprises at least one regulating device 11 for regulating the supply of base mixture to the second container 5 to regulate the supply pressure or flow rate of one between, or both, the liquid or semi-liquid base product and the gas.

According to another aspect, the machine 1 comprises at least one regulating device 11 for regulating the supply of base mixture to the second container 5 so as to independently regulate the supply pressure or flow rate of the liquid or semi-liquid base product and the gas.

In other words, according to this aspect, the flow rate or pressure of the liquid or semi-liquid base product and the gas are regulated independently of each other.

Described below is the machine of FIG. 8 when it comprises the regulating device 11 illustrated in FIGS. 9-11.

Figure 9:
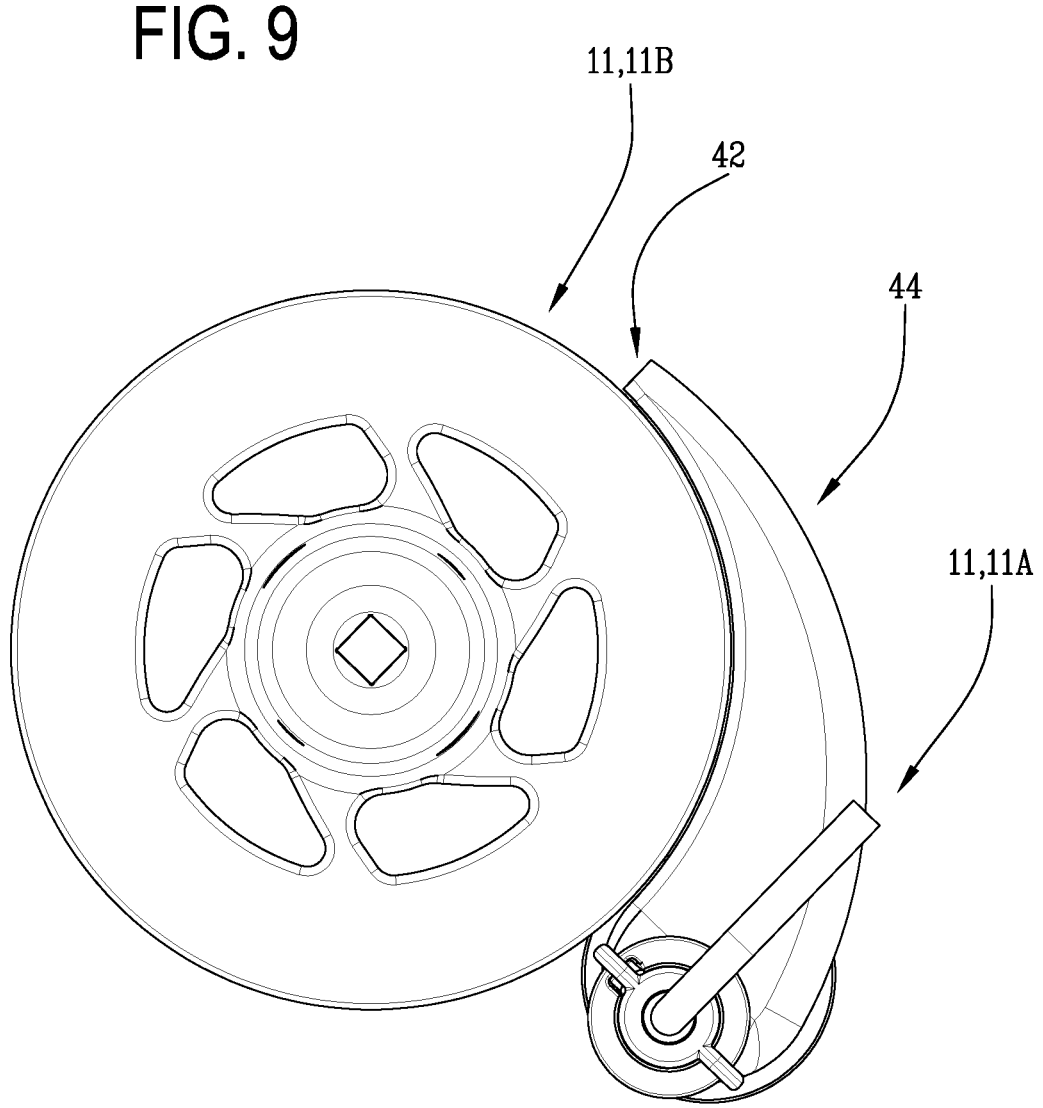
FIGS. 9-11 are, respectively, a top view, a perspective view and an exploded view of a detail of the embodiment shown in FIG. 8.
Figure 10:
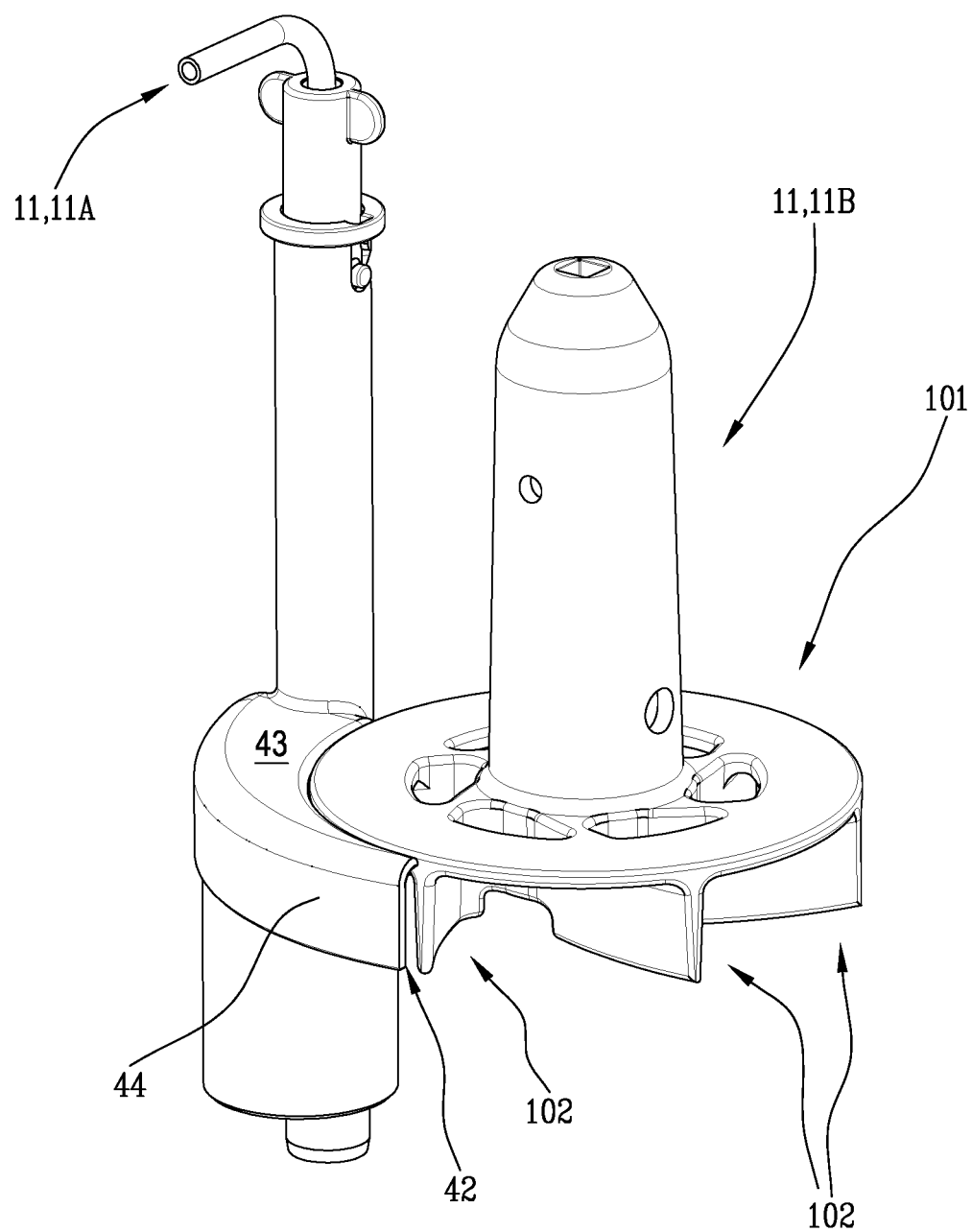
Figure 11:
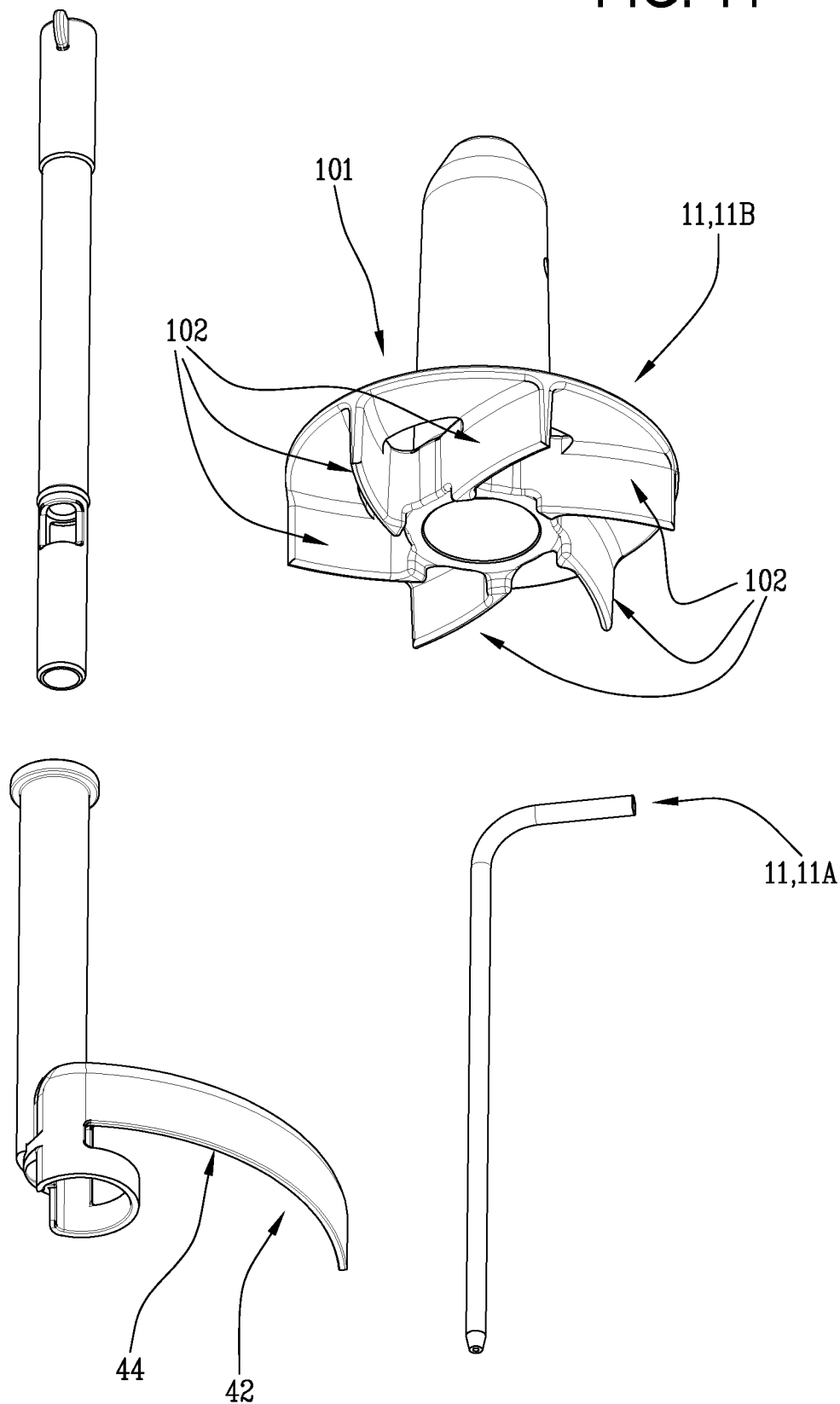

In the embodiment illustrated in FIGS. 9-11, the regulating device 11 comprises a rotary element 11B mounted inside the first container 3 and configured to move the liquid or semi-liquid base product and to feed the liquid or semi-liquid base product into the connecting duct 8.

It should be noted that the rotary element 11B is connected to a motor 104 (illustrated schematically) adapted to drive it in rotation.

Preferably, the rotary element 11B rotates about a vertical axis.

Preferably, the rotary element 11B, clearly shown in FIG. 10, is composed of a plurality of radial blades 102.

Preferably, the rotary element 11B is composed of a base portion 101 (preferably rod-shaped) and radial blades 102.

It should be noted that the rotation of the radial blades 102 allows moving the liquid or semi-liquid base product—in other words, allows imparting to the liquid or semi-liquid base product (inside the container 3) a peripheral speed (according to another aspect, also adjustable according to need).

Preferably, the control unit 10 of the machine 1 is configured to control the rotational drive of the rotary element 11B according to predetermined (and modifiable) operating rotation speeds.

That way, it is advantageously possible to regulate the flow rate or pressure of the liquid or semi-liquid base product fed into the duct 8.

In particular, the control unit 10 of the machine 1 can drive the rotary element 11B in rotation at different operating speeds so that the radial blades impart to the base liquid different motion configurations, that is to say, different operating speeds.

Preferably, the duct 8 is disposed in proximity to the rotary element 11B.

Preferably, the duct 8 is provided with an inlet section 8A.

Preferably, the inlet section 8A comprises an opening in the duct 8.

Preferably, the inlet section 8A comprises a flow directing member 42 for directing the flow of liquid moved by the rotary element 11B.

Preferably, the flow directing member 42 comprises a first wall 44, disposed in proximity to the bottom of the first container 3.

Preferably, the first wall 44 is a vertical wall.

Preferably, the first wall 44 is curvilinear.

Preferably, the flow directing member 42 comprises a second wall 43, extending horizontally.

Preferably, the second wall 43 is connected to the first wall 44.

Preferably, the second wall 43 is connected to the first wall 44 and disposed above the first wall 44.

It should be noted that the first wall 44 and the second wall 43 together define a flow directing channel for directing the base liquid (moved by the rotary element 11B) from the container 3 towards the duct 8.

Figure 8:
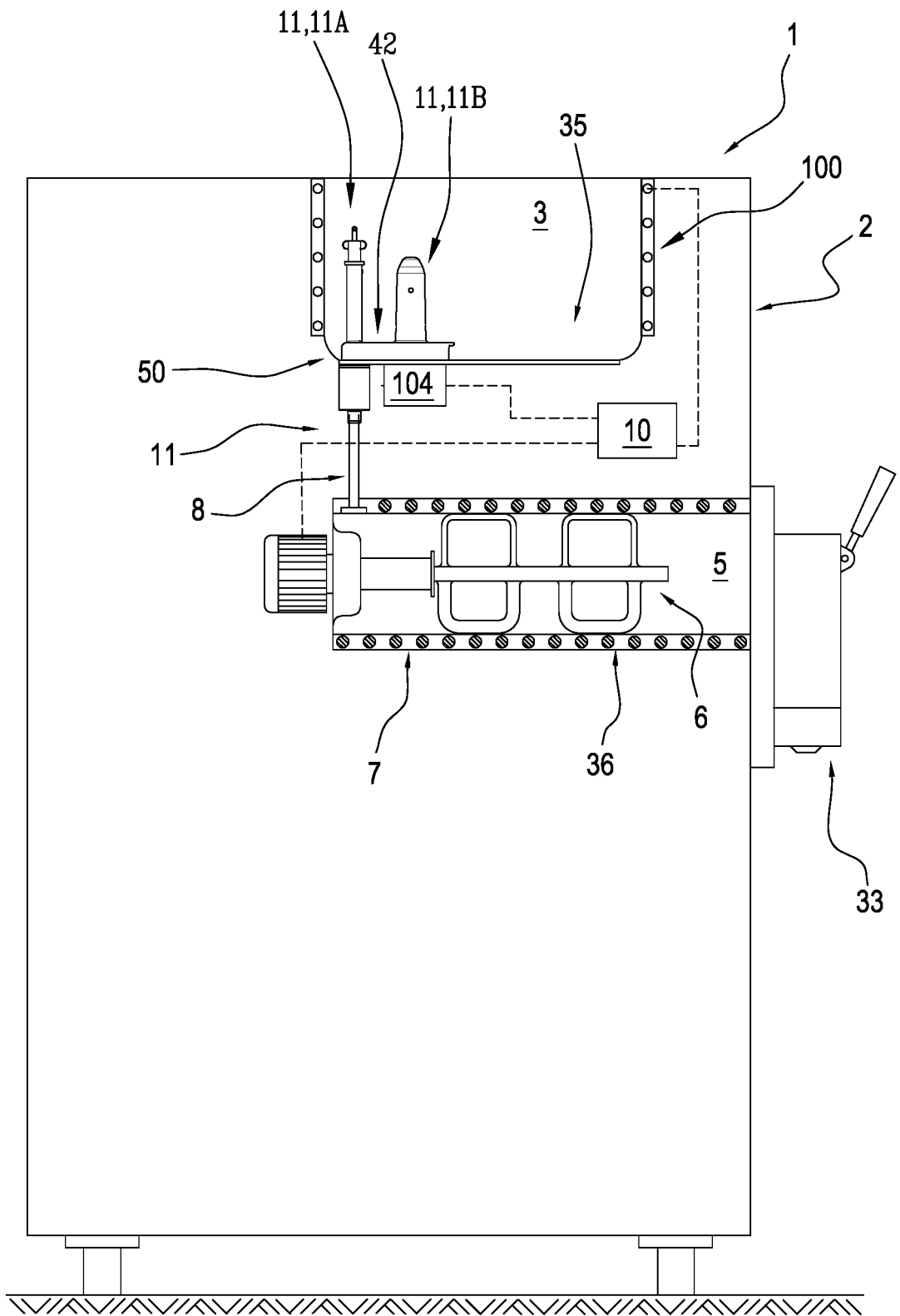
FIG. 8 is a schematic side view of a seventh embodiment of the machine of this invention for making liquid or semiliquid products.

According to another aspect in the machine 1 of FIG. 8, the regulating device 11 comprises a gas feed device 11A configured to feed gas into the connecting duct 8 at a predetermined flow rate/pressure.

It should be noted that according to another aspect, the gas feed device 11A is configured to allow regulating the flow rate/pressure of the gas fed in.

Preferably, the gas feed device 11A is a pump adapted to increase the pressure of the gas.

Preferably, the gas is air.

According to yet another aspect, the control and drive unit 10 drives the air feed device 11B and the rotary element 11B independently of each other so as to independently regulate the supply pressure or flow rate of both the liquid or semi-liquid base product and of the gas (that is to say, to regulate the supply pressure or flow rate of the liquid or semi-liquid base product and of the gas independently of each other).

It should be noted, therefore, that in the embodiment illustrated in FIG. 8, it is possible to independently regulate the supply pressure or flow rate of the liquid or semi-liquid base product and gas (according to predetermined operating logics).

With reference to the embodiment illustrated in FIGS. 12-14, the regulating device 11 comprises the aforementioned rotary element 11B (having the same features and functions as those described above with reference to FIGS. 9-11).

This embodiment also comprises a tubular supply element 40, connected to the duct 8.

The tubular supply element 40, as shown in FIGS. 12-14, is provided with a valve 200 adapted to enable or inhibit the flow of gas/liquid or semi-liquid base product mixture in the duct 8.

The operation of the tubular supply element 40 is described below.

The valve 200 is driven (i.e. switched from a closed condition C1, illustrated in FIG. 13, to an open condition A1, illustrated in FIG. 14) directly by a pressurized gas entering the tubular supply element 40.

Normally—that is to say, in the absence of pressurized gas—the valve 200 is in a closed configuration C1 (FIG. 13) in which it inhibits the mixture of gas and liquid or semi-liquid base product from flowing in the duct 8.

If the pressure of the gas exceeds a predetermined value, the valve 200 switches to the open configuration A1 (FIG. 14) in which it enables the mixture of gas and liquid or semi-liquid base product to flow in the duct 8.

The closed and open configurations C1 and A1 of the valve 200 are described in more detail below.

According to another aspect, the tubular supply element 40 is provided with a pressurized gas inlet 202.

The valve 200 is defined by a chamber 201 and a membrane 203.

Preferably, the membrane 203 is deformable (flexible).

The chamber 201 is in direct fluid communication with the pressurized gas inlet 202.

Preferably, the deformable membrane 203 is disposed in such a way as to define a wall (at the top) of the chamber 201.

The valve 200 further comprises a rod 400B which is slidable in the tubular element 200.

The rod 400B defines a shutter 406 of the valve 200.

The rod 400B is preferably a tubular rod, that is to say, it is provided with a longitudinal channel (leading out at an opening 402 at the bottom of it).

It should be noted that the chamber 201 is connected (in fluid connection) with the internal cavity of the tubular element 40.

The rod 400B is connected (at the top) to the membrane 203.

The rod 400B is also provided (in the zone near the top of its side wall) with an opening 401 leading into the longitudinal internal cavity of the rod itself.

During normal use, that is to say, when the valve 200 is in the open configuration A1, the gas flows through the opening 401.

In practice, from the inlet 202, the gas flows through the opening 401 and proceeds through the internal channel (longitudinal cavity) of the rod 400B and, when the valve is in the open configuration A1, out through the opening 402 at the bottom of the channel of the rod 400B.

The valve 200 also comprises a sealing gasket 404 adapted to seal (that is, to come into abutment against) the inside wall of the longitudinal cavity of the internal tubular element 40 when the valve 200 is in the closed configuration C1 (FIG. 13).

When the valve 200 is in the open configuration A1, on the other hand (see FIG. 14), the membrane 404 leaves a gap between the chamber 201 and the longitudinal cavity 401 of the tubular element 40, allowing the gas to flow through.

That way, in the open configuration A1 (FIG. 14), the gas entering through the inlet 202 can flow through the gap and into the (longitudinal) cavity 401 of the rod 400B.

Any base product present in the container 3 is pushed by the rotary element 11B, specifically by the radial blades 102, into a chamber 60 connected to the duct 8.

The valve 200 also comprises a further (second) gasket 405.

The further (second) gasket 405 is associated with the (bottom portion of the) rod 400B, that is to say, it is mounted on the rod 400B.

It should be noted that when the valve 200 is in the closed configuration C1, the further (second) gasket 405 comes into abutment against an opening 61 (at the bottom) of the chamber 60, thereby closing the opening 61 of the chamber 60 and preventing the liquid or semi-liquid base product from flowing out of the chamber 60 (hence preventing the liquid or semi-liquid base product from being fed into the duct 8).

The opening 61 puts the chamber 60 in communication with the duct 8.

As may be well inferred, the pressure of the gas at the inlet 202 (if greater than a predetermined value) causes the rod 400B to rise and thus to create a gap between the chamber 201 and the sealing gasket 404, allowing the gas to flow through.

At the same time, the upstroke of the rod 400B causes the gasket 405 to move and thus to form a gap through which the liquid or semi-liquid base product can flow out of the chamber 60 towards the duct 8.

Thus, the valve 200 is driven by the pressure of the gas (specifically by the pressure of the gas at the inlet 202): if the pressure of the gas is less than a predetermined value, the valve 200 is in the closed configuration C1 ("normally closed" condition); on the other hand, if the pressure is greater than the predetermined value, the valve 200 is in the open configuration A1.

It should be noted that, according to one aspect, the rod 400B may be disposed at a plurality of positions in the open configuration: that way, it is possible to adjust, as a function of the gas pressure, the size of the gaps created at the gaskets 404 and 405 for the flow of gas and base product, respectively, thereby regulating the flow rates of gas and liquid or semi-liquid base product.

It should be noted that this advantageously makes it possible to regulate the flow of liquid or semi-liquid base product and gas all but continuously and particularly precisely and also to increase the overrun of the finished product.

As is known, a particularly high overrun in the finished product corresponds to a particularly high quality in terms of organoleptic properties.

According to another aspect, the machine 1 comprises at least one regulating device 11 for regulating the supply of base mixture to the second container 5 (base mixture defined by the base product and the gas mixed therein), and operatively associated with the duct 8 to regulate the supply pressure or flow rate of one between, or both, the liquid or semi-liquid base product and the gas.

Figure 3:
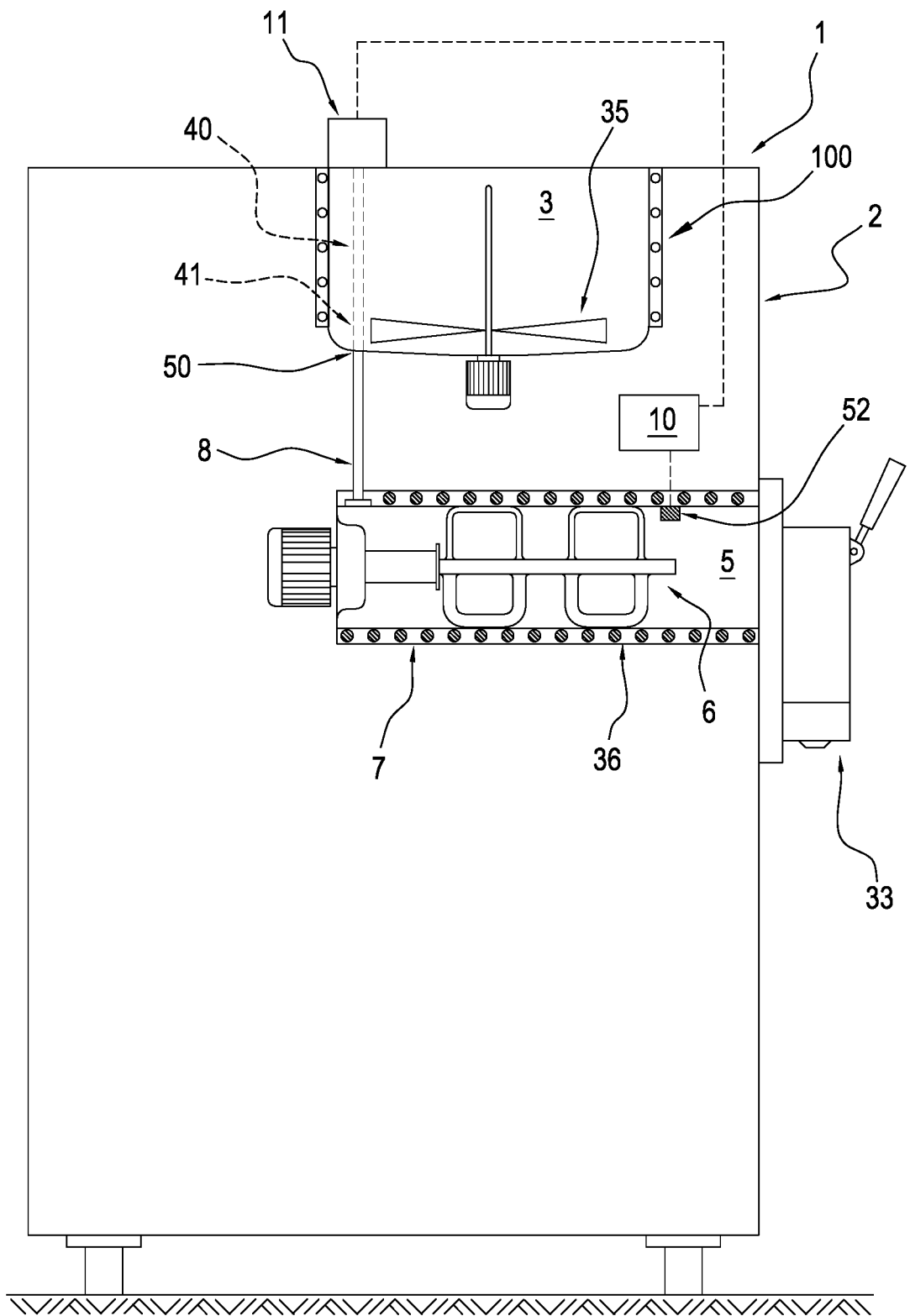
FIG. 3 is a schematic side view of a second embodiment of the machine of this invention for making liquid or semiliquid products.
Figure 4:
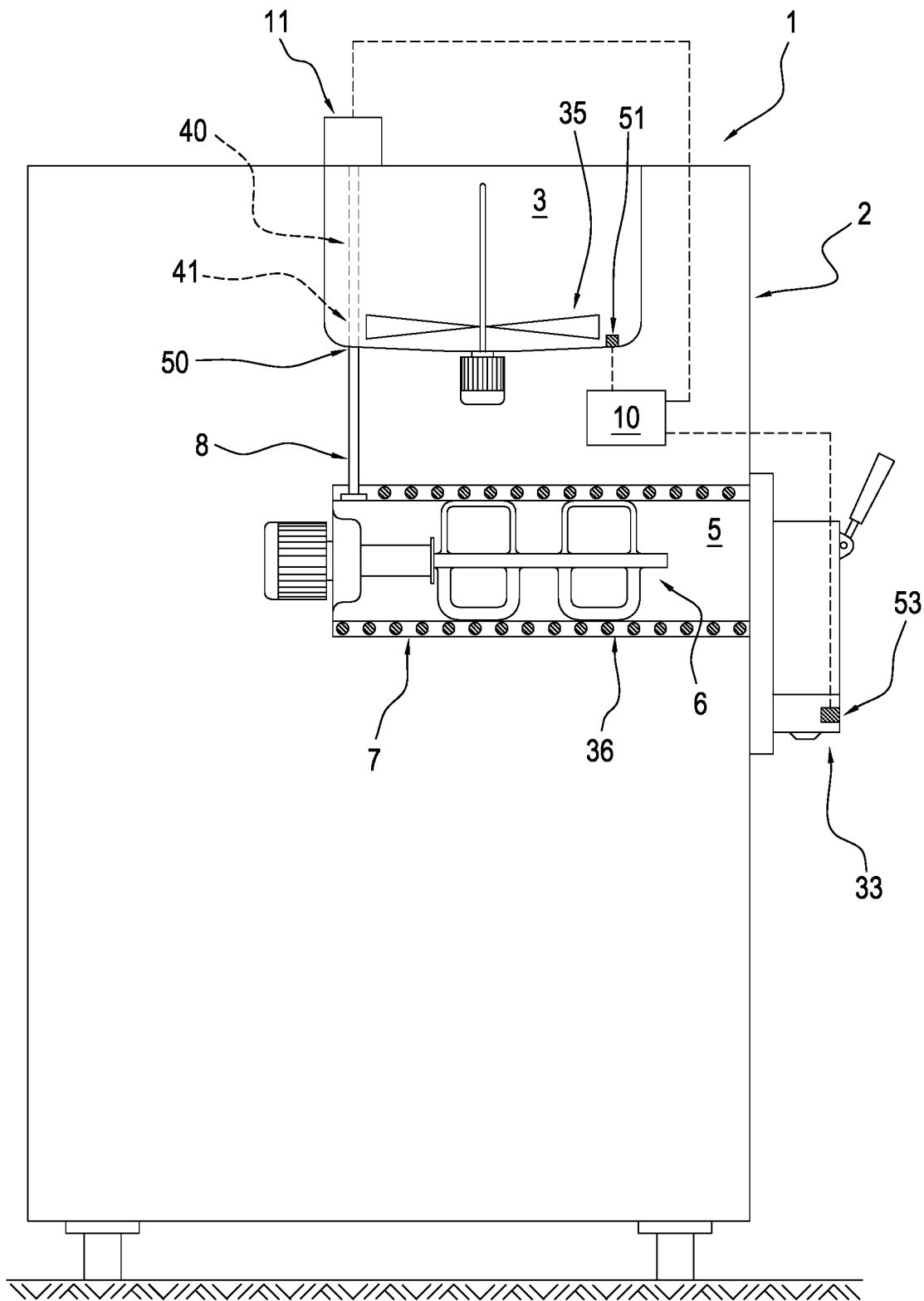
FIG. 4 is a schematic side view of a third embodiment of the machine of this invention for making liquid or semiliquid products.
Figure 5:
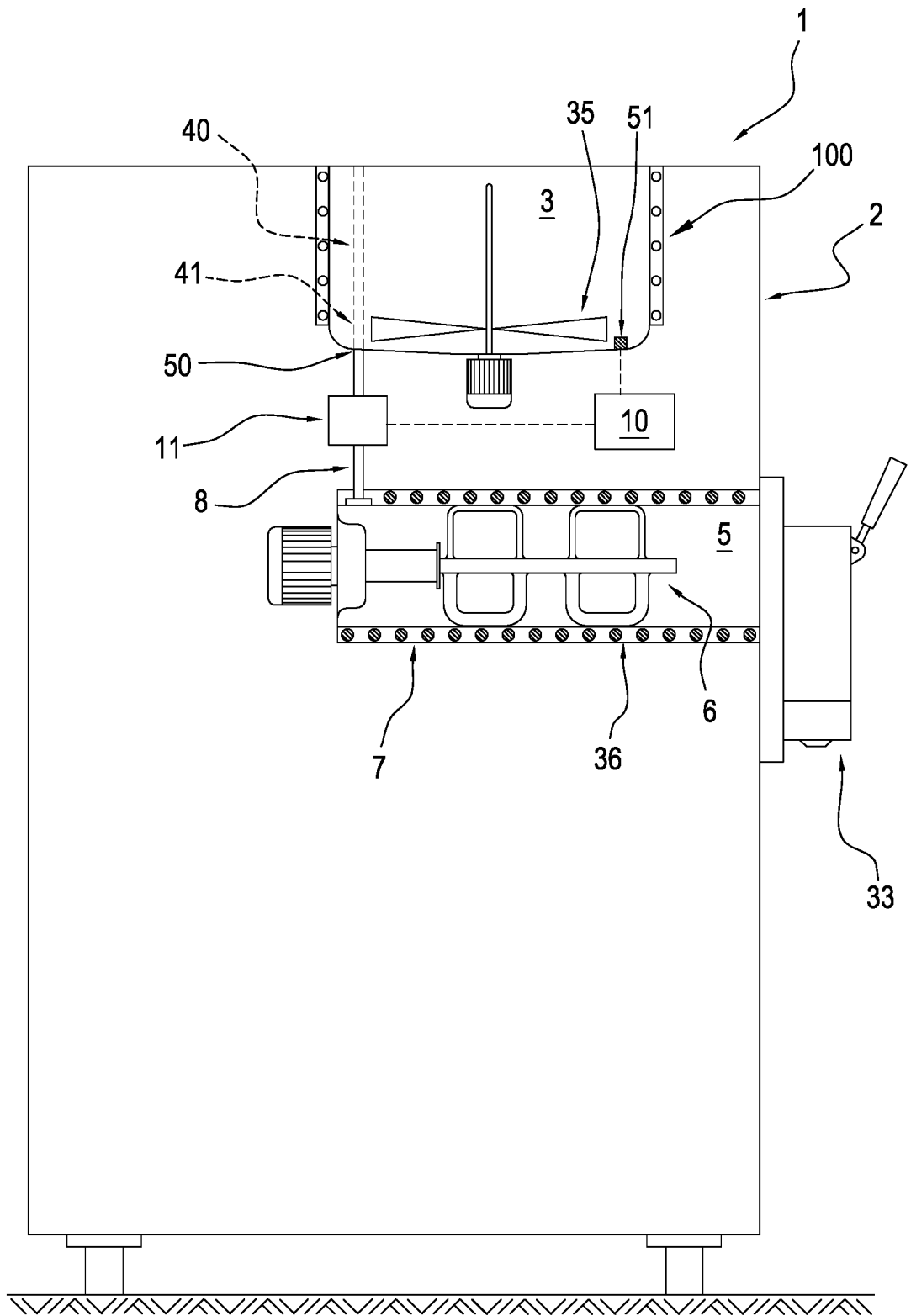
FIG. 5 is a schematic side view of a fourth embodiment of the machine of this invention for making liquid or semiliquid products.
Figure 6:
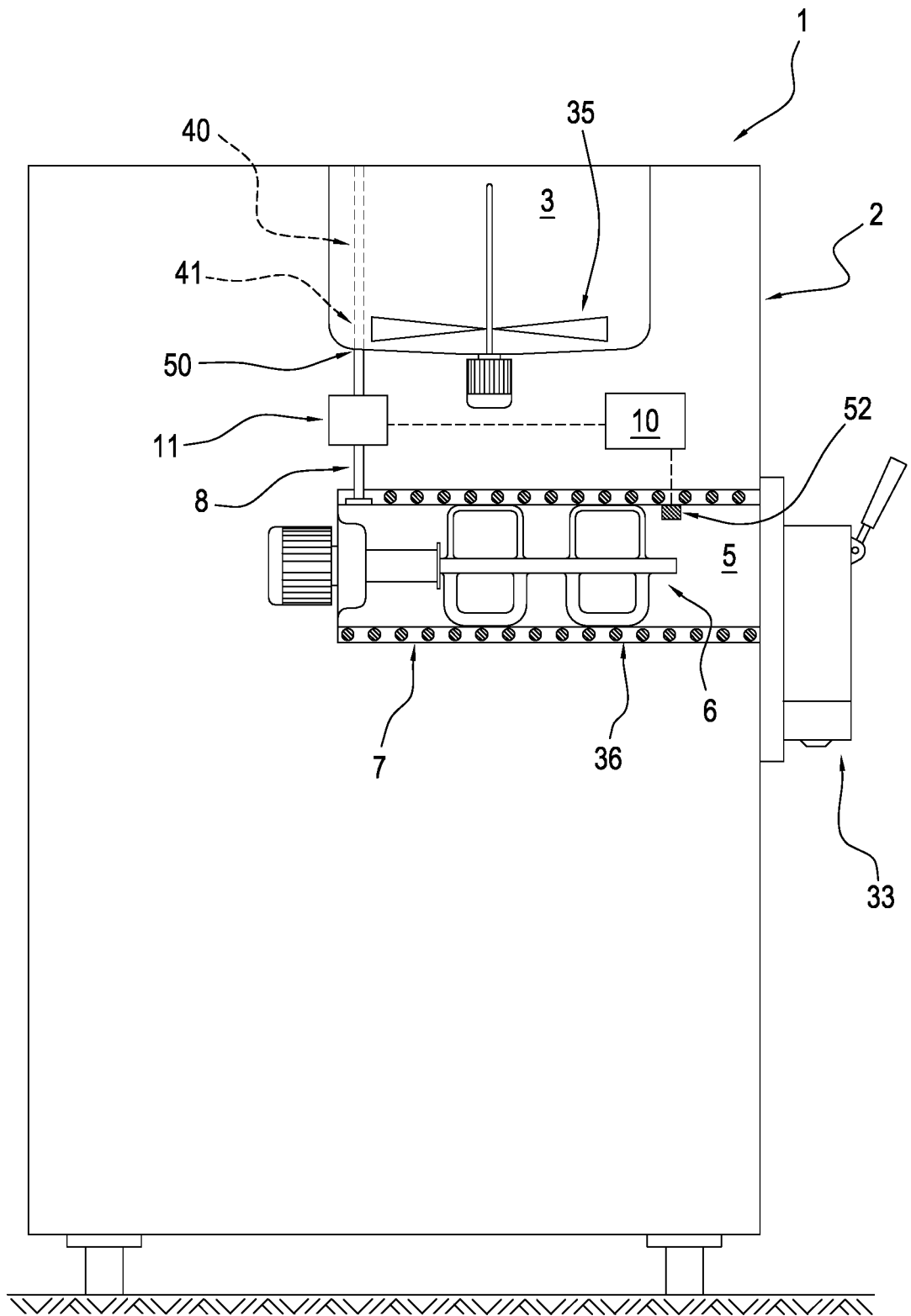
FIG. 6 is a schematic side view of a fifth embodiment of the machine of this invention for making liquid or semiliquid products.
Figure 7:
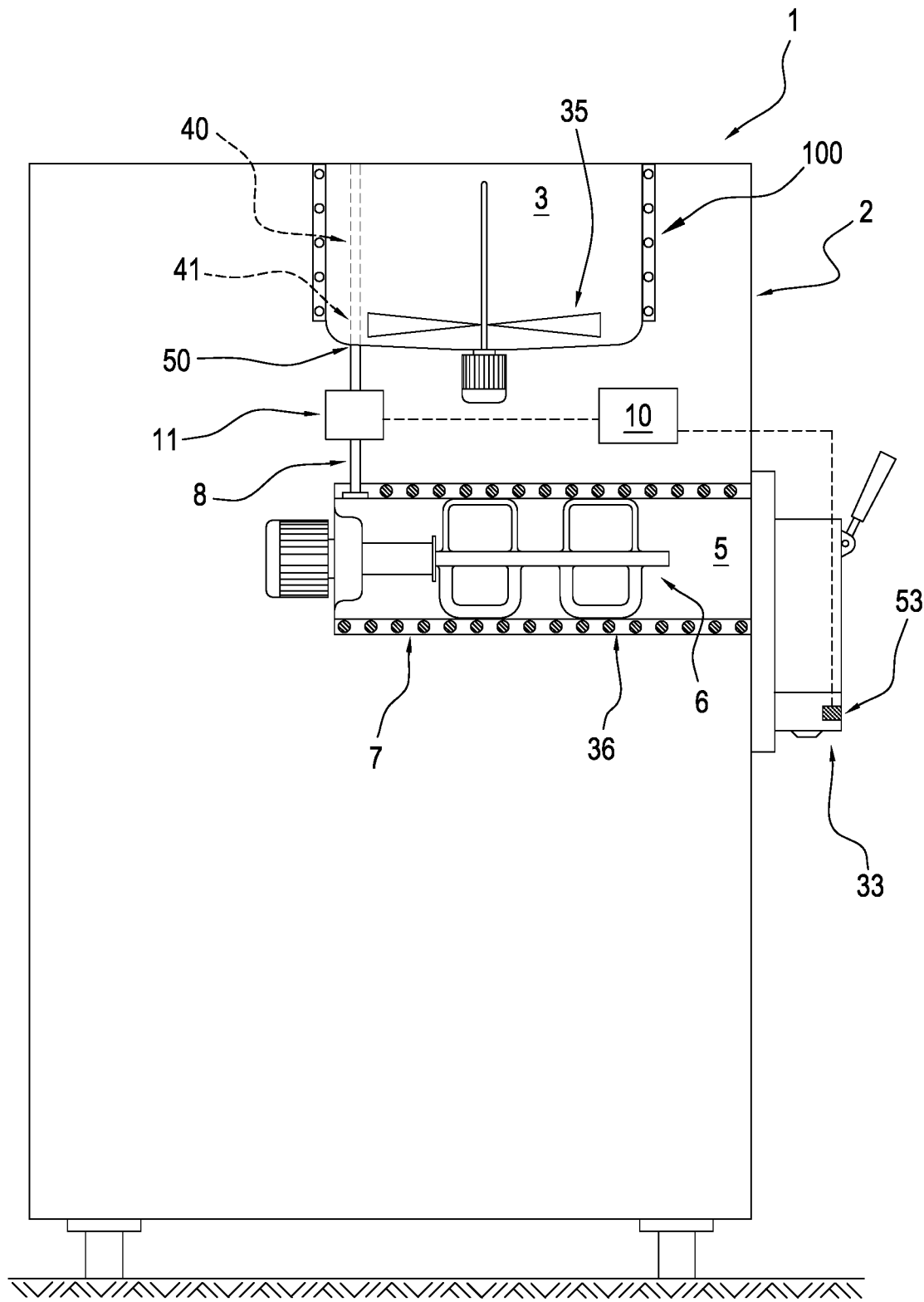
FIG. 7 is a schematic side view of a sixth embodiment of the machine of this invention for making liquid or semiliquid products.

It should be noted that in the embodiment of FIGS. 9-14, the regulating device 11 operates independently on the liquid base product and on the gas, whilst in the embodiments of FIGS. 1, 3 and 4, the regulating device 11 operates on the gas (to regulate the pressure or flow rate thereof) and in the embodiments of FIGS. 5, 6 and 7, the regulating device 11 operates on the base mixture (to regulate the pressure or flow rate thereof), that is to say, on both the base product extracted from the first container and on the gas.

According to another aspect, the machine 1 comprises a control and drive unit 10, which is connected to the base mixture supply regulating device 11 in order to drive (control) the regulating device 11. As is known, the control and drive unit 10 includes an electronic processor and predetermined programming.

The control and drive unit 10 drives the supply regulating device 11 which regulates the supply pressure or flow rate of one between, or both, the base product and the gas.

Described below are some embodiments.

In particular, in an embodiment, the regulating device 11 is a device 11 for regulating the pressure of one of one between, or both, the liquid or semi-liquid base product and the gas.

In an embodiment, the regulating device 11 is a device 11 for regulating the pressure of the gas (for example, in one of the embodiments of FIGS. 1, 3 and 4).

Preferably, the gas is air, that is to say, a mixture of oxygen and nitrogen (corresponding to the air of the environment in which the machine 1 is installed).

Preferably, the regulating device 11 is a pump.

Alternatively, the regulating device 11 is a turbine or a compressor.

More generally speaking, the regulating device 11 is a rotary element adapted to regulate the flow rate and/or the pressure of the liquid or semi-liquid base product and/or of the gas fed along the duct 8.

Preferably, the rotary element is provided with one or more radial blades adapted to operate rotationally on the liquid or semi-liquid base product and/or on the gas to regulate the flow rate and/or the pressure of the liquid or semi-liquid base product and/or of the gas fed along the duct 8.

In the embodiment, illustrated in FIGS. 1 and 4, the machine 1 comprises a sensor 51 adapted to measure a parameter representing a level of base product inside the first container 3.

The sensor 51 may be a pressure sensor or a level sensor.

The sensor 51 is operatively associated with the control and drive unit 10 in such a way that the latter receives a measurement of the parameter representing a level of base product which the sensor 51 measures inside the first container 3.

According to this aspect, the control unit 10 is configured to drive the regulating device 11 in such a way as to regulate the pressure or the flow rate of one between, or both, the liquid or semi-liquid base product and the gas, as a function of (i.e. based on) the value of the parameter representing a level of base product inside the first container 3, as measured by the sensor 51.

Preferably, in the case where the device 11 comprises a device for regulating the pressure of the gas (for example, in the embodiment of FIG. 1), the control unit 10 is configured to drive the regulating device 11 in such a way as to increase the pressure of the gas according to a function inversely proportional to the level of base product inside the first container 3.

In the embodiments illustrated in FIGS. 3 and 5, the machine 1 comprises a sensor 52 adapted to measure a parameter representing a pressure inside the second container 5.

The sensor 52 is operatively associated with the control and drive unit 10 in such a way that the latter receives a measurement (measured by the sensor 52) of the parameter representing the pressure inside the second container 5.

Preferably, the control unit 10 is configured to drive the supply regulating device 11 in such a way as to regulate the pressure or the flow rate of the at least one between the liquid or semi-liquid base product and the gas, as a function of the value of the parameter representing the pressure inside the second container 5, as measured by the sensor 52.

Figure 2:
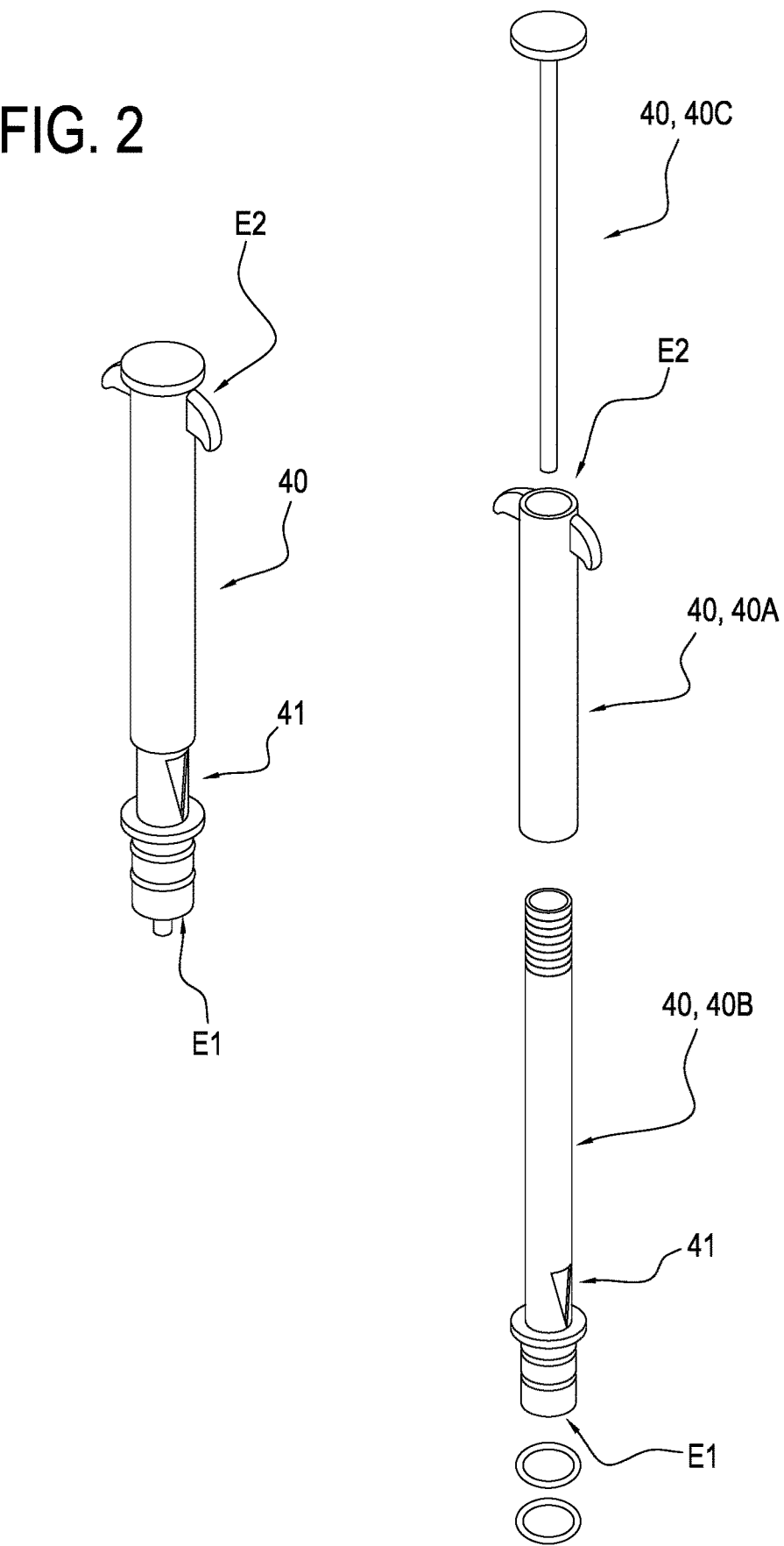
FIG. 2 schematically illustrates a detail of the machine of FIG. 1.

FIG. 2 illustrates a part of the machine 1 which is applicable to all the embodiments illustrated and which is described in more detail below.

As already set out in the foregoing description, the machine 1 preferably comprises a tubular element 40 coupled to the duct 8.

The tubular supply element 40 is provided with a hole 41 (at least one) for receiving the base product from the first container 3.

It should be noted that the tubular element 40 is in fluid communication with the duct 8 (below it).

In use, the tubular element 40 is disposed inside the first container 3.

It should be noted that the tubular element 40 is connected at one end E1 to the duct 8.

Preferably, in some embodiments, the tubular element 40 is connected at the other end E2 to the regulating device 11.

It should be noted that in an embodiment, the tubular element 40 preferably comprises a first portion 40A and a second portion 40B (connectable to each other).

The first portion 40 fits snugly round the outside of the second portion 40B.

Preferably, the relative position of the first portion 40A with respect to the second portion 40B allows adjusting the area of the hole 41 for receiving the base product.

Preferably, the tubular element 40 comprises a further portion 40C adapted to be inserted into the portions 40A and 40B to further adjust the gas passage (that is, the area of the gas passage).

The supply regulating device 11 (also referred to herein simply as regulating device 11) is operatively associated with the duct 8 (connected directly or indirectly, for example through the tubular element 40).

More precisely, in the embodiments of the machine 1 illustrated in FIGS. 1, 3 and 4, the regulating device 11 is connected directly to the tubular element 40.

According to another aspect, the machine comprises a control and drive unit 10 (hereinafter also referred to as control unit 10), which is connected to the regulating device 11 in order to drive or control the regulating device 11.

According to another aspect, the regulating device 11 comprises a device for regulating the flow rate of one of one between, or both, the liquid or semi-liquid base product and the gas (together making up the base mixture).

According to another aspect, the dispenser 33 is provided with a closing element, movable between a closed position, where dispensing of product is inhibited, and an open position, where dispensing of the product is enabled.

According to another aspect (illustrated in FIGS. 4 and 6), the machine 1 comprises a sensor 53 adapted to detect at least the position (or the movement) of the closing element of the dispenser 33 and connected to the control and drive unit 10.

In an embodiment, the control and drive unit 10 is configured to activate the regulating device 11 when the sensor 53 detects the open position of the closing element of the dispenser 33.

In another embodiment, the control and drive unit 10 is configured to activate the regulating device 11 when the sensor 53 detects a switch from the open position to the closed position of the closing element of the dispenser 33.

In yet another embodiment, the control and drive unit 10 is configured to activate the regulating device 11 when the sensor 53 detects a switch from the closed position to the open position of the closing element of the dispenser 33.

In yet another embodiment, the control and drive unit 10 is configured to activate the regulating device 11 when the sensor 53 detects a movement of the closing element of the dispenser 33.

According to another aspect, the machine 1 comprises a user interface for adjusting a value of preset pressure (P*) or preset flow rate (PO*) of the gas or liquid or semi-liquid product, or both, and configured to allow selecting a value of pressure (P*) or flow rate (PO*) of the gas or liquid or semi-liquid product, or both.

The user interface is connected to the control and drive unit 10 to transmit the selected value to the control and drive unit 10.

According to one aspect, the control and drive unit 10 is configured to drive the regulating device 11 to regulate a supply pressure or flow rate of at least one between, or both, the liquid or semi-liquid base product or the gas, in such a way that it is equal to the pressure (P*) or flow rate (PO*) selected from the user interface.

According to another aspect, the user interface comprises a display and at least one control to allow setting a parameter associated with the preset pressure (P*) or preset flow rate (PO*).

Preferably, the gas is one of the following:
a gaseous mixture comprising oxygen and nitrogen;
air;
oxygen;
nitrogen;
carbon dioxide.

Further aspects of the machine 1 of the invention will now be described.

Preferably, according to one aspect, where the machine comprises the regulating device 11, the regulating device 11 is configured to compress the gas up to a maximum overpressure of 0.06 bar (meaning by "overpressure" the pressure over and above atmospheric pressure).

Preferably, according to another aspect, applicable to each of the machines described and illustrated herein, the regulating device 11 is switched on and off according to a cycle which includes a predetermined ON time (Ton) and a predetermined OFF time (Toff).

More precisely, the control unit 10 is configured to switch the regulating device 11 on and off according to cycles which include a predetermined ON time (Ton) and a predetermined OFF time (Toff).

Preferably, for each cycle, the ON time (Ton) is between 20% and 40%, while the OFF time (Toff) is between 80% and 60% (complement to 100 of the ON time).

It should be noted that, preferably, the ON time is between 0.1 seconds and 0.3 seconds and the OFF time is between 0.2 and 0.4 seconds.

Advantageously, the machine 1 of the invention allows feeding the second container 5 with a mixture in the correct (required) stoichiometric ratio (between the gas, or air, and base mixture) under any conditions and, specifically, during transients resulting from the dispensing or extraction of a quantity of finished product from the second container 5.

Furthermore, irrespective of the level of base product inside the first container 3, the second container 5 is advantageously fed with a base mixture (base product and gas) having the required stoichiometric ratio between gas and base mixture present in the first container 3.

Advantageously, the machine described herein allows implementing a feed method known as "assisted gravity feed": in effect, feed from the first container 3 to the second container 5 is performed by gravity (by means of the pressure due to the level of the base product in the first container 3 and the value of the pressure in the second container 5) and the regulating device 11 is enabled to allow regulating the pressure or the flow rate of the mixture fed in).

This advantageously also ensures that the mixture is fed into the second container 5 in the correct stoichiometric ratio.

As is known, a negative pressure is generated in the second container 5, particularly as a result of product being extracted from it and this negative pressure, in the prior art, causes the base mixture to be fed to the second container 5 in an incorrect stoichiometric ratio (base liquid/gas); advantageously, the solution proposed and claimed herein ensures that the proportions of the base liquid product and the gas (specifically air) transferred to the second container 5 remain constant.

It should be noted that one advantage of this invention is that of providing a machine capable of making high quality ice cream.

Advantageously, the machine 1 ensures feed continuity and stability.

More specifically, according to the invention, the second container 5 is supplied with a base mixture which allows making a finished product whose overrun is substantially constant (stable), the overrun being measured in a sample volume as follows:

$$\text{overrun} = ((\text{liquid base product weight} - \text{finished product weight})/(\text{finished product weight})) * 100.$$

It should be noted that the weight of the liquid base product and the weight of the finished product (ice cream) are measured in the same volume, adopted as sample volume.

Keeping the overrun under control in a stable manner in this way ensures that the end product (ice cream) is of superior quality.

In effect, the machine 1 of this invention allows keeping the batch freezing cylinder supplied at all times with base mixture under optimum conditions (that is to say, in the right stoichiometric ratio), particularly in situations where prior art solutions result in an out-of-balance ratio between air and base product.

According to another aspect, the control and drive unit 10 is connected to the regulating device 11 to drive the regulating device 11 in such a way as to keep substantially equal to a preset value an overrun parameter measured in a predetermined volume (sample volume) taking into account the liquid or semi-liquid finished product made in the second container 5, as follows:

$$\text{overrun} = ((\text{base mixture weight} - \text{finished product weight})/(\text{finished product weight}))*100.$$

That way, the overrun in the finished product is kept substantially within a predetermined interval of values (preferably constant).

This guarantees a finished product of high quality.

According to another aspect of it, the invention defines a method for operating a machine according to any one of the accompanying claims (a method for making a liquid or semi-liquid product, preferably an ice cream type product), comprising the following steps:

supplying base mixture from the first container 3 to the second container 5 through the duct 8;

setting in rotation the stirrer 6 mounted inside the second container 5 and activating the thermal treatment means 7 associated with the second container 5 to convert the base mixture (liquid and semi-liquid base product plus gas) into a finished liquid or semi-liquid product (preferably an ice cream type product), wherein the step of supplying the base mixture from the first container 3 to the second container 5 through the duct 8 comprises a step of adjusting a supply parameter of the base mixture supplied from the first container 3 to the second container 5 through the duct 8.

Preferably, the step of regulating a supply parameter of the base mixture supplied to the container 5 comprises regulating the supply pressure or flow rate of one between, or both, the liquid or semi-liquid base product and the gas.

According to another aspect, the step of regulating a supply parameter of the base mixture allows keeping substantially equal to a preset value an overrun parameter measured in a predetermined volume (sample volume) taking into account the liquid or semi-liquid finished product made in the second container 5, as follows:

$$\text{overrun} = ((\text{weight of base mixture supplied} - \text{finished product weight})/(\text{finished product weight}))*100.$$

It should be noted that the weight of the base mixture supplied and the weight of the finished product are measured in the same volume, adopted as sample volume.

According to another aspect, the step of regulating a supply parameter of the base mixture supplied to the second container 5 comprises a step of establishing a laminar or turbulent flow in the liquid or semi-liquid base product and/or gas.

According to another aspect, the step of regulating a supply parameter of the base mixture supplied to the second container 5 comprises a step of regulating the supply pressure or flow rate of the liquid or semi-liquid base product and gas independently.

Advantageously, according to this aspect, the supply to the second container 5 can be adjusted precisely and accurately, thereby obtaining a particularly high overrun to meet the customer's expectations.

According to another aspect, the step of adjusting a supply parameter of the base mixture supplied from the first container 3 to the second container 5 through the duct 8 comprises a step of regulating the pressure or the flow rate of one between, or both, the liquid or semi-liquid base product and the gas supplied through the duct 8.

According to another aspect, the step of adjusting a supply parameter of the base mixture supplied from the first container 3 to the second container 5 through the duct 8 comprises a step of measuring a parameter (e.g. pressure, mixture consistency, temperature, level, volume occupied by the product) inside the second container 5 using a sensor in order to adjust the base mixture supply parameter on the basis of the value measured by the sensor.

According to another aspect, the step of adjusting a supply parameter of the base mixture supplied from the first container 3 to the second container 5 through the duct 8 comprises adjusting a supply parameter of the base mixture supplied through the duct 8 in order to keep the overrun parameter substantially constant at a high-performing, preset value.

What is claimed is:

1. A machine for making liquid or semi-liquid food products comprising:
    a frame;
    a first container configured for containing a liquid or semi-liquid base product;
    a second container defining a processing chamber for processing a base mixture made up of the liquid or semi-liquid base product and a gas;
    a stirrer mounted inside the second container;
    a thermal treatment system operating under a thermodynamic cycle and including a heat exchanger thermally connected with the second container, acting in conjunction with the stirrer to convert the base mixture inside the second container into a finished liquid or semi-liquid product;
    a connecting duct connecting the first container to the second container and configured to connect the first container to the second container to allow the base mixture to be transferred to the second container;
    a dispenser connected to the second container to allow dispensing the finished liquid or semi-liquid product;
    a regulating device configured for regulating a supply of base mixture to the second container to regulate a supply pressure or flow rate of one between, or both, the liquid or semi-liquid base product and the gas supplied through the connecting duct;
    a control and drive unit connected to the regulating device and configured to drive the regulating device the control and drive unit including an electronic processor and predetermined programming;
    wherein the regulating device comprises a rotary element which includes a base portion and a plurality of radial blades extending from the base portion, the rotary element being mounted inside the first container to rotate about a vertical axis and being configured to move the liquid or semi-liquid base product and to feed the liquid or semi-liquid base product into the connecting duct by the movement;

wherein the control and drive unit is configured to control a rotational drive of the rotary element according to predetermined and modifiable operating rotation speeds, to regulate the supply pressure or flow rate of the liquid or semi-liquid base product fed into the connecting duct;

wherein the control and drive unit is configured to drive the rotary element in rotation at different operating speeds so that the radial blades impart different operating speeds to the liquid or semi-liquid base product;

wherein the connecting duct is disposed in proximity to the rotary element;

wherein the connecting duct includes an inlet section;

wherein the inlet section comprises an opening in the connecting duct;

wherein the inlet section comprises a flow directing member for directing the flow of the liquid or semi-liquid base product moved by the rotary element.

2. The machine according to claim 1, wherein the regulating device comprises a gas feed device including a pump and configured to feed gas into the connecting duct at a predetermined flow rate and/or pressure.

3. The machine according to claim 2, wherein the control and drive unit drives the gas feed device and the rotary element independently of each other so as to independently regulate the supply pressure or flow rate of both the liquid or semi-liquid base product and of the gas.

4. The machine according to claim 1, wherein the regulating device comprises a valve configured to be set to a closed configuration that prevents the gas and the liquid or semi-liquid base product from flowing into the connecting duct, and to be set to open configuration that allows the gas and the liquid or semi-liquid base product to flow into the connecting duct.

5. The machine according to claim 4, wherein the valve includes a shutter which is movable between the closed configuration and the open configuration under effect of the gas pressure.

6. The machine according to claim 5, wherein the shutter is configured such that the shutter is in the closed configuration when the gas pressure is below a predetermined value and the shutter is in the open configuration when the gas pressure is above the predetermined value.

7. The machine according to claim 5, comprising a tubular supply element and wherein the shutter is defined by a hollow, tubular rod mounted movably inside the tubular supply element, the tubular supply element including an inlet for the gas and an inlet for the liquid or semi-liquid base product.

8. The machine according to claim 7, wherein the rod is provided with at least one gasket adapted to close a through aperture for the gas and/or the liquid or semi-liquid base product.

9. The machine according to claim 8, wherein the at least one gasket includes a first gasket adapted to close the through aperture for the gas and a second gasket adapted to close the through aperture for the liquid or semi-liquid base product.

10. The machine according to claim 1, comprising a sensor configured for measuring a parameter representing a level of the liquid or semi-liquid base product inside the first container, the sensor being operatively connected with the control and drive unit so that the control and drive unit receives the measurement of the parameter representing the level of the liquid or semi-liquid base product inside the first container measured by the sensor and the control and drive unit is configured to drive the regulating device to regulate the pressure or the flow rate of one between, or both, the liquid or semi-liquid base product and the gas, as a function of a value of the parameter representing the level of the liquid or semi-liquid base product inside the first container, as measured by the sensor.

11. The machine according to claim 1, comprising a sensor configured for measuring a parameter representing a pressure inside the second container, the sensor being operatively connected with the control and drive unit so that the control and drive unit receives a measurement of the parameter representing the pressure inside the second container measured by the sensor and the control and drive unit is configured to drive the regulating device for regulating the supply of at least one between the liquid or semi-liquid base product and the gas in such a way as to regulate the pressure or the flow rate of the at least one between the liquid or semi-liquid base product and the gas as a function of a value of the parameter representing the pressure inside the second container measured by the sensor.

12. A method for operating a machine for making liquid or semi-liquid food products, the method comprising the following steps:

providing a machine, comprising:
a frame;
a first container configured for containing a liquid or semi-liquid base product;
a second container defining a processing chamber for processing a base mixture made up of the liquid or semi-liquid base product and a gas;
a stirrer mounted inside the second container;
a thermal treatment system operating under a thermodynamic cycle and including a heat exchanger thermally connected with the second container, acting in conjunction with the stirrer to convert the base mixture inside the second container into a finished liquid or semi-liquid product;
a connecting duct connecting the first container to the second container and configured to connect the first container to the second container to allow the base mixture to be transferred to the second container;
a dispenser connected to the second container to allow dispensing the finished liquid or semi-liquid product;
a regulating device configured for regulating a supply of base mixture to the second container to regulate a supply pressure or flow rate of one between, or both, the liquid or semi-liquid base product and the gas supplied through the connecting duct;
a control and drive unit connected to the regulating device and configured to drive the regulating device the control and drive unit including an electronic processor and predetermined programming;
wherein the regulating device comprises a rotary element which includes a base portion and a plurality of radial blades extending from the base portion, the rotary element being mounted inside the first container to rotate about a vertical axis and being configured to move the liquid or semi-liquid base product and to feed the liquid or semi-liquid base product into the connecting duct by the movement;
wherein the control and drive unit is configured to control a rotational drive of the rotary element according to predetermined and modifiable operating rotation speeds, to regulate the supply pressure or flow rate of the liquid or semi-liquid base product fed into the connecting duct;
wherein the control and drive unit is configured to drive the rotary element in rotation at different operating speeds so that the radial blades impart different operating speeds to the liquid or semi-liquid base product;

wherein the connecting duct is disposed in proximity to the rotary element;

wherein the connecting duct includes an inlet section;

wherein the inlet section comprises an opening in the connecting duct;

wherein the inlet section comprises a flow directing member for directing the flow of the liquid or semi-liquid base product moved by the rotary element;

supplying the liquid or semi-liquid base mixture from the first container to the second container through the connecting duct;

setting in rotation the stirrer mounted inside the second container and activating the thermal treatment means associated with the second container to convert the base mixture into a finished liquid or semi-liquid product, wherein the step of supplying the base mixture from the first container to the second container through the connecting duct comprises a step of regulating a supply parameter of the liquid or semi-liquid base mixture supplied to the second container so as to regulate the supply pressure or the flow rate of one between, or both, the liquid or semi-liquid base product and the gas.

13. The method according to claim 12, wherein the step of regulating the supply parameter of the liquid or semi-liquid base mixture supplied to the second container comprises a step of establishing a laminar or turbulent flow in the liquid or semi-liquid base product and/or the gas.

14. The method according to claim 13, wherein the step of regulating the supply parameter of the liquid or semi-liquid base mixture supplied to the second container comprises a step of regulating the supply pressure or flow rate of the liquid or semi-liquid base product and gas independently.

15. The method according to claim 12, wherein the step of regulating the supply parameter of the liquid or semi-liquid base mixture comprises a step of:

rotating the rotary element to move the liquid or semi-liquid base product and to feed the liquid or semi-liquid base product into the connecting duct.

16. The method according to claim 15, wherein the step of regulating the supply parameter of the liquid or semi-liquid base mixture comprises a step of:

regulating the supply pressure or flow rate of the gas.

17. The method according to claim 16, wherein the step of regulating the supply pressure or flow rate of the gas comprises regulating the supply pressure or flow rate of the gas fed independently of the supply pressure or flow rate of the liquid or semi-liquid base product.

18. The method according to claim 17, wherein the step of regulating the supply parameter of the liquid or semi-liquid base mixture comprises a step of regulating the supply pressure or flow rate of the gas.

19. The method according to claim 12, wherein the step of regulating the supply parameter of the base mixture supplied from the first container to the second container through the connecting duct comprises a step of regulating the supply pressure or flow rate of one between the liquid or semi-liquid base product or the gas, supplied through the connecting duct, so as to adjust a ratio between the liquid or semi-liquid base product and the gas.

20. The method according to claim 12, wherein the step of regulating the supply parameter of the liquid or semi-liquid base mixture supplied from the first container to the second container through the connecting duct comprises a step of measuring a parameter inside the second container using a sensor in order to adjust the base mixture supply parameter as a function of a value measured by the sensor.

* * * * *